March 5, 1935.  F. A. HOLT  1,993,665
MEANS FOR DETECTING AND CONTROLLING GASES
Filed July 30, 1929
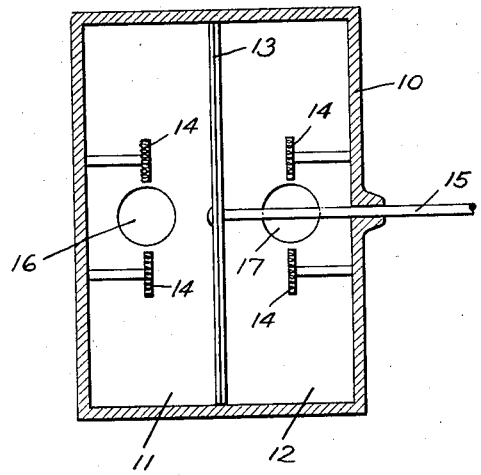
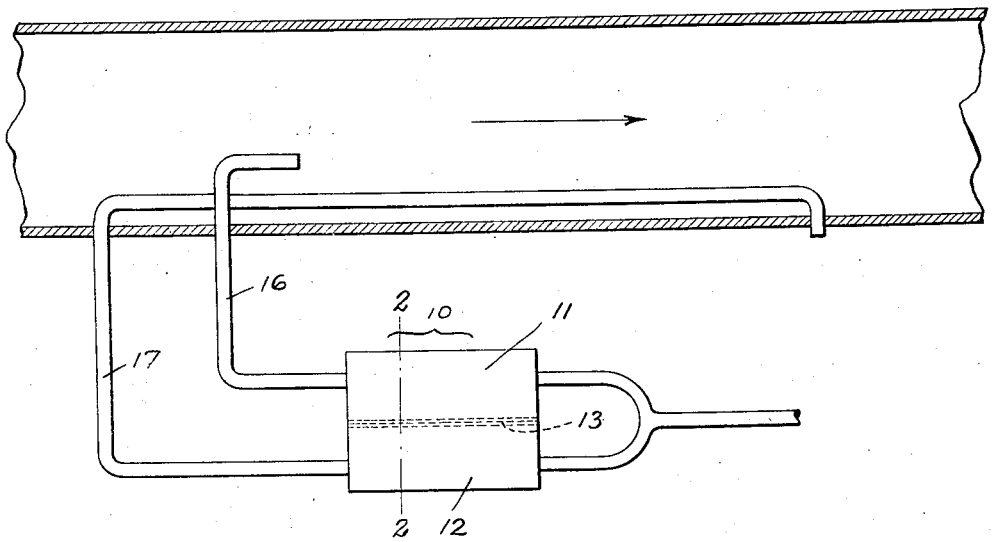
INVENTOR.
Francis A. Holt.
BY Buell, Dunn & Anderson
ATTORNEYS.

Patented Mar. 5, 1935

1,993,665

UNITED STATES PATENT OFFICE 1,993,665

MEANS FOR DETECTING AND CONTROLLING GASES

Francis A. Holt, New York, N. Y., assignor, by mesne assignments, to Moto-Vita Corporation, New York, N. Y., a corporation of Delaware Application July 30, 1929, Serial No. 382,251

3 Claims. (Cl. 73—51)

This invention relates to means for detecting the presence of gases, and more particularly, to the analyzation of exhaust gases for effecting fuel control in the operation of internal combustion engines.

The general object of the invention is to provide a system for indicating the presence of reducing gases adapted to be oxidized, and causing the actuation of auxiliary fuel control devices responsive to said measurement. It is highly desirable, in the operation of internal combustion engines, to obtain substantially complete combustion of the fuel mixture. If the exhaust gases indicate incomplete combustion, it is obvious that a change in the fuel mixture is required in order to effect more complete oxidation. Applicant's invention is designed not only to detect the presence of unburned fuel products, but to compensate for their presence by correspondingly varying the character of the mixture.

Another object of the invention is to utilize the difference in thermal conductivity of carbon dioxide compared to that of another gas, whereby the relative amounts of carbon dioxide in the exhaust gases of an internal combustion engine will be utilized as a guide for determining the character of the fuel mixture.

Other objects and features will be more apparent from the following detailed description of one form of the invention, to be read in connection with the accompanying drawing, in which:

Fig. 1 shows an actuating mechanism operative responsive to the relative amounts of carbon dioxide in exhaust gas of an internal combustion engine, or the like; and Fig. 2 is a more detailed sectional view of the mechanism utilized in the arrangement of Fig. 1, taken along the line 2—2 thereof.

Considering Figs. 1 and 2, numeral 10 designates a casing divided into chambers 11 and 12 by a differential thermostatic diaphragm 13. This diaphragm preferably comprises a pair of sheets of metal of different thermostatic values arranged so that the forces developed in the sheets responsive to changes in temperature will be in opposition to each other. Positioned within the casing, and at each side of the diaphragm, are electrical heating units 14 suitably mounted. Rod 15 is suitably mounted on the diaphragm and is actuated in response to movement thereof.

Pipes 16 and 17 lead to chambers 11 and 12 respectively, pipe 17 serving to discharge air into chamber 11, whereas pipe 16 discharges exhaust gas into chamber 12. The air through pipe 17 is first heated to the temperature of the exhaust gas in any suitable manner, preferably by running the pipe through the exhaust manifold, so that the temperature of the air and gas entering casing 10 will be the same. Since the thermal conductivity of carbon dioxide is only 40% that of air, the conductivity of the heat from units 14 in chamber 12 to the diaphragm will depend upon the amount of carbon dioxide in the exhaust gas. The greater the amount of carbon dioxide in the exhaust gas, the less will be the rate of conduction from the heater units to the diaphragm compared to the rate of conduction in chamber 11. As a result, the amount of carbon dioxide in the exhaust gas will determine the action of the diaphragm and hence the extent of movement of the rod 15. The actuation of the rod may be used to operate auxiliary mechanism, such as a supplementary air supply, to the carbureter or intake manifold, for varying the fuel mixture.

Any suitable means may be used for drawing the gas and air through the pipes 16 and 17 and the chambers 11 and 12. By way of suggestion, the junction of the pipes may be connected to the intake manifold of the engine, using the suction present to draw the gases through the pipes. For use on airplanes, a Venturi tube which is well known may be used to provide the required suction.

It may be noted that while air is employed, it is possible to use any other gas or standard through pipe 17; and applicant considers within the purview hereof any system wherein the differential in rates of conduction through different gaseous media is utilized as a fuel control for internal combustion engines. It is also understood that any suitable indicating means may be employed to reflect temperature changes responsive to variations in the character of an exhaust gas, in a system for detecting and measuring a pressure differential between different gases, or different volumes of the same gas.

Having described my invention, what I claim as new and desire to secure by Letters Patent is:

1. In a system of the character described, a casing, a diaphragm dividing the casing into a plurality of chambers, means for discharging exhaust gas within one of the chambers, means for discharging another gas into the other of the chambers, heating means in each of said chambers, and an actuating element mounted on the diaphragm and leading without the casing.

2. A system of the character described including a casing, a diaphragm dividing said casing into a plurality of chambers, means for discharging exhaust gas within one of the chambers, means for discharging another gas into the other of the chambers, means for heating the gas in each of said chambers to substantially the same temperature, and an actuating element mounted on the diaphragm and leading without the casing.

3. A device of the character described comprising a casing, a diaphragm of bi-metallic thermal characteristics dividing the casing into a plurality of chambers, means for passing exhaust gas into one of said chambers, means for passing a comparative standard gas into the other of said chambers, heating means in each of said chambers, and means for transmitting movement of said diaphragm outside of said casing.

FRANCIS A. HOLT.